United States Patent
Axmon et al.

(10) Patent No.: US 10,721,053 B2
(45) Date of Patent: Jul. 21, 2020

(54) METHODS AND APPARATUS FOR SYNCHRONIZATION OF COMMUNICATION DEVICES OPERATING IN HALF DUPLEX MODE

(71) Applicant: Telefonaktiebolaget LM Ericsson (publ), Stockholm (SE)

(72) Inventors: Joakim Axmon, Malmö (SE); Johan Bergman, Stockholm (SE); Yufei Blankenship, Kildeer, IL (US); Santhan Thangarasa, Vällingby (SE); Kazuyoshi Uesaka, Kanagawa (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 115 days.

(21) Appl. No.: 15/508,705

(22) PCT Filed: Feb. 14, 2017

(86) PCT No.: PCT/EP2017/053301
§ 371 (c)(1),
(2) Date: Mar. 3, 2017

(87) PCT Pub. No.: WO2017/140681
PCT Pub. Date: Aug. 24, 2017

(65) Prior Publication Data
US 2018/0145819 A1    May 24, 2018

Related U.S. Application Data

(60) Provisional application No. 62/295,254, filed on Feb. 15, 2016.

(51) Int. Cl.
*H04L 5/16*    (2006.01)
*H04W 56/00*    (2009.01)
(Continued)

(52) U.S. Cl.
CPC .............. *H04L 5/16* (2013.01); *H04L 1/08* (2013.01); *H04W 4/70* (2018.02); *H04W 56/005* (2013.01);
(Continued)

(58) Field of Classification Search
CPC .......... H04L 5/0092; H04L 5/16; H04W 4/70; H04W 56/005
See application file for complete search history.

(56) References Cited

U.S. PATENT DOCUMENTS

| 2003/0123556 A1* | 7/2003 | Komori | G11B 27/034 375/240.26 |
| 2009/0232236 A1* | 9/2009 | Yamamoto | H04W 52/262 375/260 |

(Continued)

FOREIGN PATENT DOCUMENTS

WO    2015192885 A1    12/2015

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0 (Dec. 2015), Dec. 2015, 1-141.
(Continued)

*Primary Examiner* — Ayaz R Sheikh
*Assistant Examiner* — Debebe A Asefa
(74) *Attorney, Agent, or Firm* — Murphy, Bilak & Homiller, PLLC

(57) ABSTRACT

Methods and apparatus disclosed herein enable a half-duplex, HD, wireless communication device, WCD (16), to remain synchronized to a supporting communication network (10), during uplink transmissions that use a large repetition factor, also referred to a using a large bundle size. For example, the WCD (16) uses a rule whereby the WCD
(Continued)

(16) tunes back to the downlink carrier from time to time while making an uplink transmission that uses a large repetition factor. Re-tuning to the downlink carrier from time to time in this manner allows the WCD (16) to correct and maintain its time and frequency synchronization with respect to the network (10).

30 Claims, 4 Drawing Sheets

(51) Int. Cl.
  *H04W 4/70* (2018.01)
  *H04L 1/08* (2006.01)
  *H04L 5/00* (2006.01)
  *H04L 27/00* (2006.01)
(52) U.S. Cl.
  CPC ........ *H04L 5/0092* (2013.01); *H04L 27/0014* (2013.01)

(56) References Cited

U.S. PATENT DOCUMENTS

| | | | |
|---|---|---|---|
| 2016/0192304 A1* | 6/2016 | Yi | H04B 7/2656 370/311 |
| 2016/0242170 A1* | 8/2016 | Xu | H04W 4/70 |
| 2016/0301503 A1* | 10/2016 | Rico Alvarino | H04B 1/713 |
| 2017/0118792 A1* | 4/2017 | Rico Alvarino | H04W 76/28 |

OTHER PUBLICATIONS

3GPP, 3rd Generation Partnership Project; Technical Specification Group Radio Access Network; Evolved Universal Terrestrial Radio Access (E-UTRA); Physical layer procedures (Release 12) 3GPP TS 36.213 V 12.7.0 Release 12, Sep. 2015, pp. 6-184, 166-222.
Unknown Author, "Introduction of further LTE Physical Layer Enhancements for MTC", Change Request 36.213 CR0540 rev 4 Current version: 12.7.0 3GPP TSG-RAN Meeting #70 R1-157926 Stiges, Spain, Dec. 7-10, 2015, 1-2.
Unknown Author, "Introduction of LC/CE MTC", Change Request 36.211 CR0207 rev 5 Current version: 12.7.0, 3GPP TSG-RAN WG1 Meeting #83 R1-157918 Anaheim, USA, Nov. 15-22, 2015, 1-117.
Unknown Author, "Introduction of LC/EC MTC", Change Request 36.201 CR0011 rev—Current version 12.2.0 3GPP TSG-RAN WG1 Meeting #83 R1-157518 Anaheim, USA, Nov. 15-22, 2015, 1-10.
Unknown Author, "Introduction of Rel-13 features of eMTC in 36.212", Change Request 36.212 CR0181 rev 1 Current version: 12.6.0 3GPP TSG—RAN1 Meeting #83 R1-157916 Anaheim, USA, Nov. 15-22, 2015, 1-10.
Unknown Author, "Introduction of Rel-13 eMTC feature to LTE RAN1 specs", 3GPP TSG RAN Meeting #70 RP-152024 Sitges, Spain, Dec. 7-10, 2015, 1.
Unknown Author, "Revised WI: Further LTE Physical Layer Enhancements for MTC", 3GPP TSG RAN Meeting #67 RP-150492 Shanghai, China, Mar. 9-12, 2015, 19.
Unknown Author, "Revised Work Item: Narrowband IoT (NB-IoT)", 3GPP TSG RAN Meeting #70 RP-152284 revision of RP-152232 Sitges, Spain, Dec. 7-10, 2015, 1-11.
Unknown, Author, "Remaining details of physical channel time and frequency relationships", 3GPP TSG RAN WG1 Meeting #83, R1-156500, Intel Corporation, Anaheim, USA, Nov. 16-20, 2015, pp. 1-7.

* cited by examiner

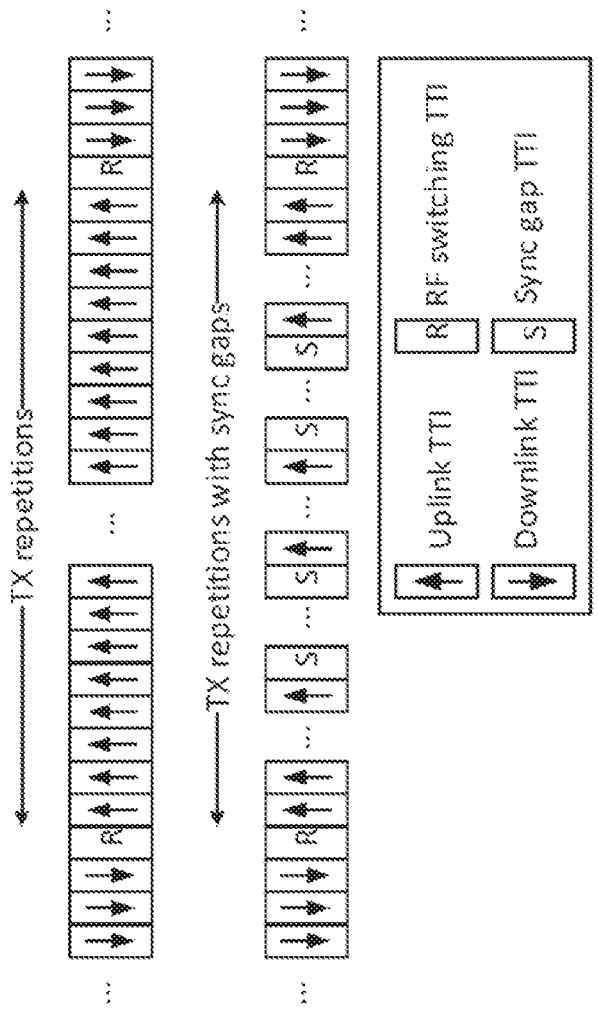
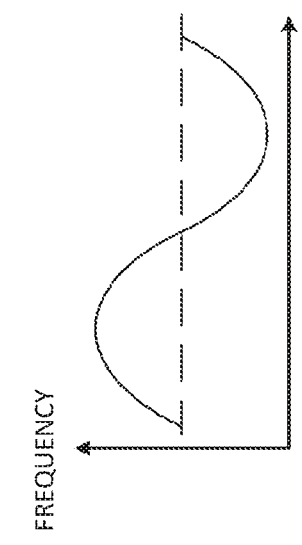

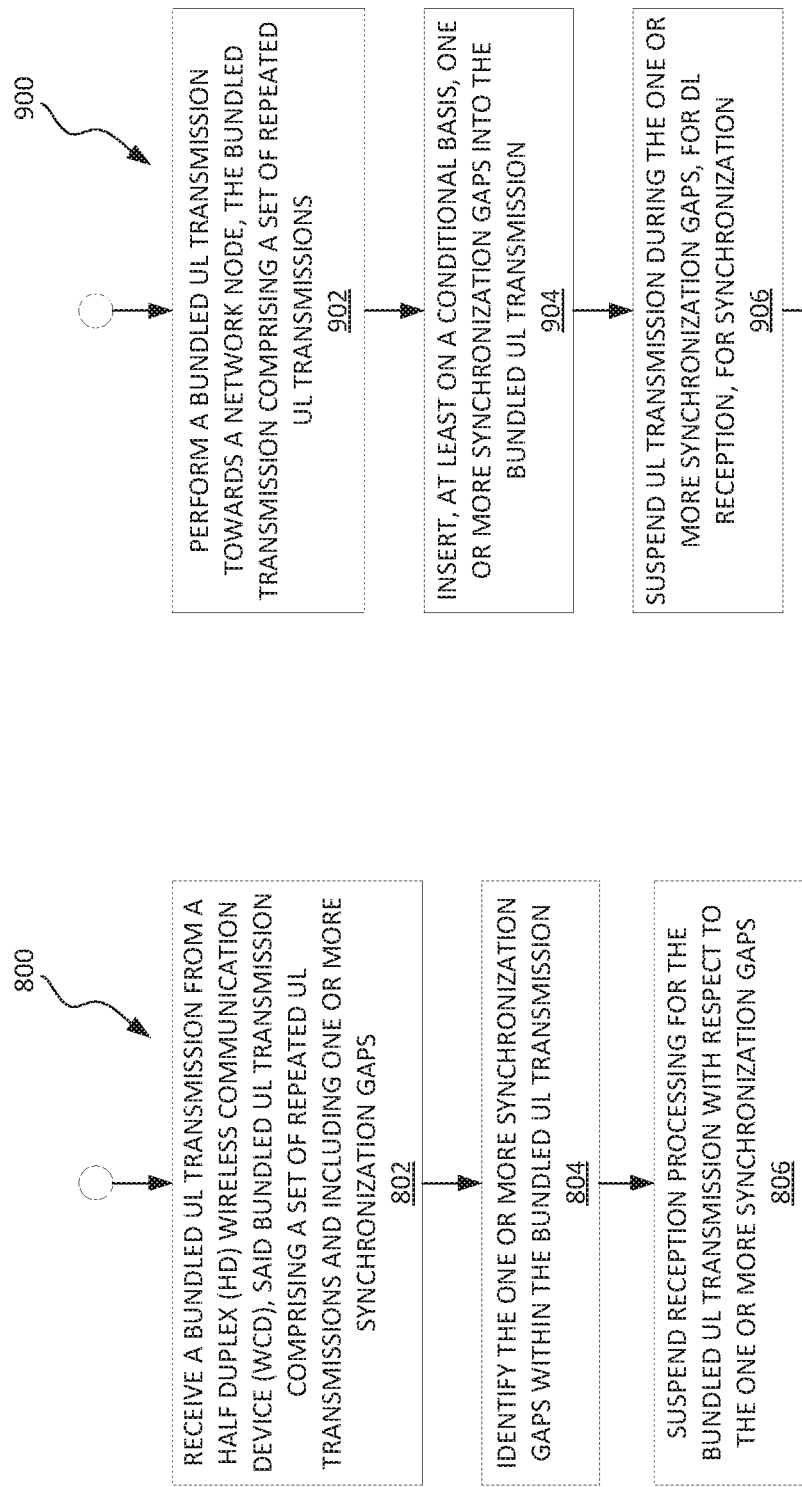

METHODS AND APPARATUS FOR SYNCHRONIZATION OF COMMUNICATION DEVICES OPERATING IN HALF DUPLEX MODE

TECHNICAL FIELD

The present invention relates to wireless communication networks, and particularly relates to synchronization of half-duplex wireless communication devices operating in such networks.

BACKGROUND

Cellular communication systems are currently being developed and improved for machine type communications (MTC). MTC is characterized by lower demands on data rates than for example mobile broadband, but generally has more stringent requirements regarding cost, service coverage, power. For example, a MTC device may be intended to operate for years on batteries, without charging or replacing the batteries.

Currently, the Third Generation Partnership Project (3GPP) is standardizing Enhanced Machine-Type Communications (eMTC) as well as Narrowband Internet of Things (NB-IoT) as part of LTE Release 13 for satisfying all the requirements put forward by MTC type applications, while maintaining backward compatibility with the current LTE radio access technology. See RP-150492 (3GPP TSG RAN Meeting #67, Shanghai, China, 9-12 Mar. 2015) regarding eMTC, and see RP-152284 (3GPP TSG RAN Meeting #70, Sitges, Spain, Dec. 7-10, 2015) regarding NB-IoT.

The eMTC features specified in RP-152024 and in R1-157926 (3GPP TSG RAN Meeting #70, Sitges, Spain, Dec. 7-10, 2015) include a low-complexity User Equipment (UE) category called UE category M1 (or Cat-M1 for short) and Coverage Enhancement (CE) techniques involving CE modes A and B that can be used together with UE category M1 or any other LTE UE category.

All eMTC features (both Cat-M1 and CE modes A and B) operate using a reduced maximum channel bandwidth compared to normal LTE. The maximum channel bandwidth in eMTC is 1.4 MHz, whereas it is up to 20 MHz in normal LTE. The eMTC UEs are still able to operate within the larger LTE system bandwidth without problem. The main difference compared to normal LTE UEs is that the eMTCs can only be scheduled with 6 Physical Resource Blocks (PRBs), 180 kHz at a time.

In CE modes A and B, the coverage of physical channels is enhanced through various coverage enhancement techniques, the most important being repetition or retransmission. In its simplest form, this means that the 1-ms subframe to be transmitted is repeated a number of times, e.g., just a few times if a small coverage enhancement is needed or hundreds or thousands of times if a large coverage enhancement is needed.

The objective of NB-IoT is to specify a radio access for cellular IoT, based to a great extent on a non-backward-compatible variant of E-UTRA, that addresses improved indoor coverage, support for massive number of low throughput devices, low delay sensitivity, ultra-low device cost, low device power consumption and (optimized) network architecture. Here, "E-UTRA" denotes "Evolved UMTS Terrestrial Radio Access" and "UMTS" denotes the "Universal Mobile Telecommunications Service."

The NB-IoT carrier bandwidth is 200 KHz, and examples of operating bandwidth for LTE are 1.4 MHz, 3 MHz, 5 MHz, 10 MHz, 15 MHz, 20 MHz, etc. NB-IoT supports three different modes of operation. A first mode, "Stand-alone operation," uses for example the spectrum currently being used by GSM Edge Radio Access Network (GERAN) systems as a replacement of one or more GSM carriers, where "GSM" denotes the "Global System for Mobile Communications." In principle, NB-IoT operates on any carrier frequency which is neither within the carrier of another system and not within the guard band of another system's operating carrier. The other system can be another NB-IoT system or a system associated with another Radio Access Technology (RAT), such as a LTE system. A second mode, "Guard band operation," uses the unused resource blocks within a LTE carrier's guard band. The term "guard band mode" may be used interchangeably with the term "guard bandwidth." As an example, in case of LTE BW of 20 MHz (100 Resource Blocks or RBs), the guard band operation of NB-IoT can be placed anywhere outside the central 18 MHz but within 20 MHz LTE BW.

A third, mode contemplated for NB-IoT, referred to as "In-band operation," uses resource blocks within a normal LTE carrier. The in-band operation mode may also be referred to as in-bandwidth operation. Broadly, the operation of one RAT within the BW of another RAT is referred to as in-band operation. As an example, in a LTE BW of 50 RBs (50 RBs), NB-IoT operation over one resource block (RB) within the 50 RBs is called in-band operation.

In NB-IoT, the downlink transmission is based on OFDM with 15 kHz subcarrier spacing for all the scenarios: stand-alone, guard-band, and in-band. For UL transmission, both multi-tone transmissions based on SC-FDMA, and single tone transmission is supported. This means that the physical waveforms for NB-IoT in the downlink and also partly in the uplink are similar to those seen in LTE.

In the downlink design, NB-IoT supports both master information broadcast and system information broadcast, of which broadcasts are carried by different physical channels. For in-band operation, it is possible for a NB-IoT UE to decode the NB Physical Broadcast Channel (NB-PBCH) without knowing the legacy Physical Radio Block (PRB) index. NB-IoT supports both downlink physical control channel (NB-PDCCH, or NB-M-PDCCH) and downlink physical shared channel (PDSCH). The operating mode of NB-IoT must be indicated to the UE, and currently 3GPP considers indication by means of NB Secondary Synchronization Signal (NB-SSS), NB Master Information Block (NB-MIB), or perhaps via other downlink signals.

The references signals used in NB-IoT are expected to follow the general design principles seen in LTE. For example, downlink synchronization signals for NB-IoT operation may include a NB Primary Synchronization Signal (NB-PSS) and a NB-SSS.

In half duplex (HD) or more specifically. HD Frequency Division Duplex (FDD), the uplink (UL) and downlink (DL) transmissions take place on different paired carrier frequencies but not simultaneously in time in the same cell. This means the UL and DL transmissions take place in different time resources. Examples of time resource are symbols, time slots, subframes, transmission time intervals (TTIs), interleaving times, etc. In other words. UL and DL (e.g., subframes) do not overlap in time. The number and location of subframes used for DL, UL or unused subframes can vary on the basis of a frame or a multiple of frames. For example, in one radio frame (say frame #1) subframes #9, #0, #4 and #5 are used for DL, and subframes #2 and #7 are used for UL transmission. But in another frame (say frame #2) subframes

0 and #5 are used for DL and subframes #2, #3, #7 and #8 are used for UL transmission.

One issue recognized herein is that a NB-IoT or eMTC device (henceforth a wireless communication device or "WCD") operating in half duplex (HD) mode will lose frequency synchronization to the network node when configured with a high repetition factor for uplink transmissions. The repetition factor may be referred to as "bundle size." Affected uplink transmissions include: (a) UL control channel transmission, e.g., PUCCH for eMTC and NB-PUCCH for NB-IoT: (b) UL data channel transmission, e.g., PUSCH for eMTC and NB-PUSCH for NB-IoT; (c) physical random access channel transmission, PRACH for eMTC and NB-PRACH. For eMTC, the repetition factor may be as large as 2048, meaning that the transmission is repeated in 2048 consecutive UL subframes (or more if there are invalid UL subframes). For NB-IoT devices, operating over a smaller bandwidth (one sixth of the eMTC bandwidth), even larger repetition factors are anticipated. During the time of the repeated transmissions, a WCD operating in HD cannot receive on the downlink, and, therefore, cannot stay tuned to the downlink carrier frequency.

Large repetition factors are typically used to facilitate maintained connectivity when the WCD is operating in an enhanced or extreme coverage scenario. For example, assume that a given value or lower range of received signal level defines "normal" coverage operation. Enhanced coverage operation may then be understood as operating with lower-than-normal received signal levels, e.g., Signal-to-Noise-and-Interference-Ratios (SINRs) down to −15 dB. There may be further levels of enhanced coverage, such as an extreme coverage scenario involving −15 dB>SINR>=−20 dB.

High repetition factors—large bundle sizes—provide for operation in such coverage scenarios, but it is recognized herein that large bundle sizes create other problems. For example, UL transmissions with larger repetition result in frequency drift at the transmitting HD WDC because: 1) the extended time the HD WCD is tuned away from the downlink carrier, and 2) heating of circuitry in the HD WCD from continuous operation of the power amplifiers (PAs) in the HD WCD. When operating in enhanced or extreme coverage, the HD WCD typically uses its maximum transmit (TX) power, making the PA by far the largest power consumer in the modem of the HD WCD. For example, the power consumed by the PA during such times may be at least an order of magnitude larger than the whole baseband circuitry of the HD WCD. As a further example, a commercial Cat4 LTE modem operating with full throughput on downlink and uplink and using maximum transmit power uses about 57% of its total power on the PA and only 7% and 9% on DL and UL baseband processing, respectively.

The temperature changes impact the voltage controlled crystal oscillator (VCXO) of the HD WCD. The VCXO frequency increases or decreases in dependence on the temperature and on the time derivative of the temperature. See FIG. 1, which plots example behavior.

Crystal oscillators that are temperature compensated, referred to as TCXOs, display less frequency deviation in response to temperature changes, but TCXOs have drawbacks when it comes to their frequency response to voltage control. Plus, TXCOs are more expensive than VCXOs. Hence, WCD vendors prefer VCXOs. This fact is particularly important for NB-IoT and eMTC devices, because low device cost is required for achieving a significant penetration of their intended markets.

To achieve acceptable performance when receiving low-power or low-level signals, a network base station, such as an eNB or eNodeB in LTE parlance, accumulates the repeated transmissions from a HD WCD directly before rate restoration, after rate restoration and/or after attempting to decode the message (decoder branch metrics of soft bits). The effect of frequency drift at the HD WCD over the course of its repeated uplink transmissions introduces a gradual change in the received messages at the base station, even though the radio channel as such may be stationary. The change may introduce destructiveness in the coherent combining of sequentially received messages, and will additionally contribute to inter-carrier interference (ICI) and inter-symbol interference (ISI). At the same time, due to the enhanced or extreme coverage scenario and the resulting low SNR operating point, it is challenging for the network node to estimate and compensate for the drifting WCD carrier frequency.

Moreover, the frequency drift in the HD WCD results in time drift, whereby the timing at which the Orthogonal Frequency Division Multiplex (OFDM) symbols, or single- or multi Lone symbols transmitted by it gradually changes. Those changes lead to inter-symbol interference (ISI), as well as to a gradual phase change of the received signal (linear phase). Both ISI and gradually changing linear phase introduce additional destructiveness in the coherent accumulation carried out by the receiving network node.

SUMMARY

Methods and apparatus disclosed herein enable a half-duplex (HD) wireless communication device (WCD) to remain synchronized to a supporting communication network, during uplink transmissions that use a large repetition factor (a large bundle size). For example, the WCD uses a rule whereby the WCD tunes back to the downlink carrier from time to time while making an uplink transmission that uses a large repetition factor. Re-tuning to the downlink carrier from time to time in this manner allows the WCD to correct and maintain its time and frequency synchronization with respect to the network.

In an example embodiment, the rule is predetermined while in another example the rule is configured, and can be changed or updated. In either case, the rule to be used by the WCD at any given time is known both to the WCD and to the network. That is, according to the rule, there are gaps or instances during a HD uplink (UL) transmission by the WCD during which the WCD stops transmitting, so that it can tune to the downlink (DL) frequency/carrier. Correspondingly, during these instances, the network node(s) receiving the UL transmissions by the WCD stop receiving and accumulating. Allowing the WCD to synchronize during the repetitive UL transmissions, improves system performance reducing the inter-carrier and inter-symbol interference that would otherwise arise as a consequence of time and frequency drift at the WCD during repeated UL transmissions.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a plot of an example temperature-frequency relationship for a crystal oscillator circuit.

FIG. 2 is a diagram of one embodiment of synchronization gap puncturing, as contrasted with conventional operation without puncturing.

FIG. 3 is a table illustrating example synchronization gap patterns proscribed for or associated with different transmission repetition levels.

FIG. 4 is another table illustrating a set of defined synchronization gap pattern identifiers and corresponding gap parameters.

FIG. 8 is a logic flow diagram of a method of processing at a network node.

FIG. 9 is a logic flow diagram of a method of processing at a half-duplex wireless communication device.

DETAILED DESCRIPTION

Figure 5:
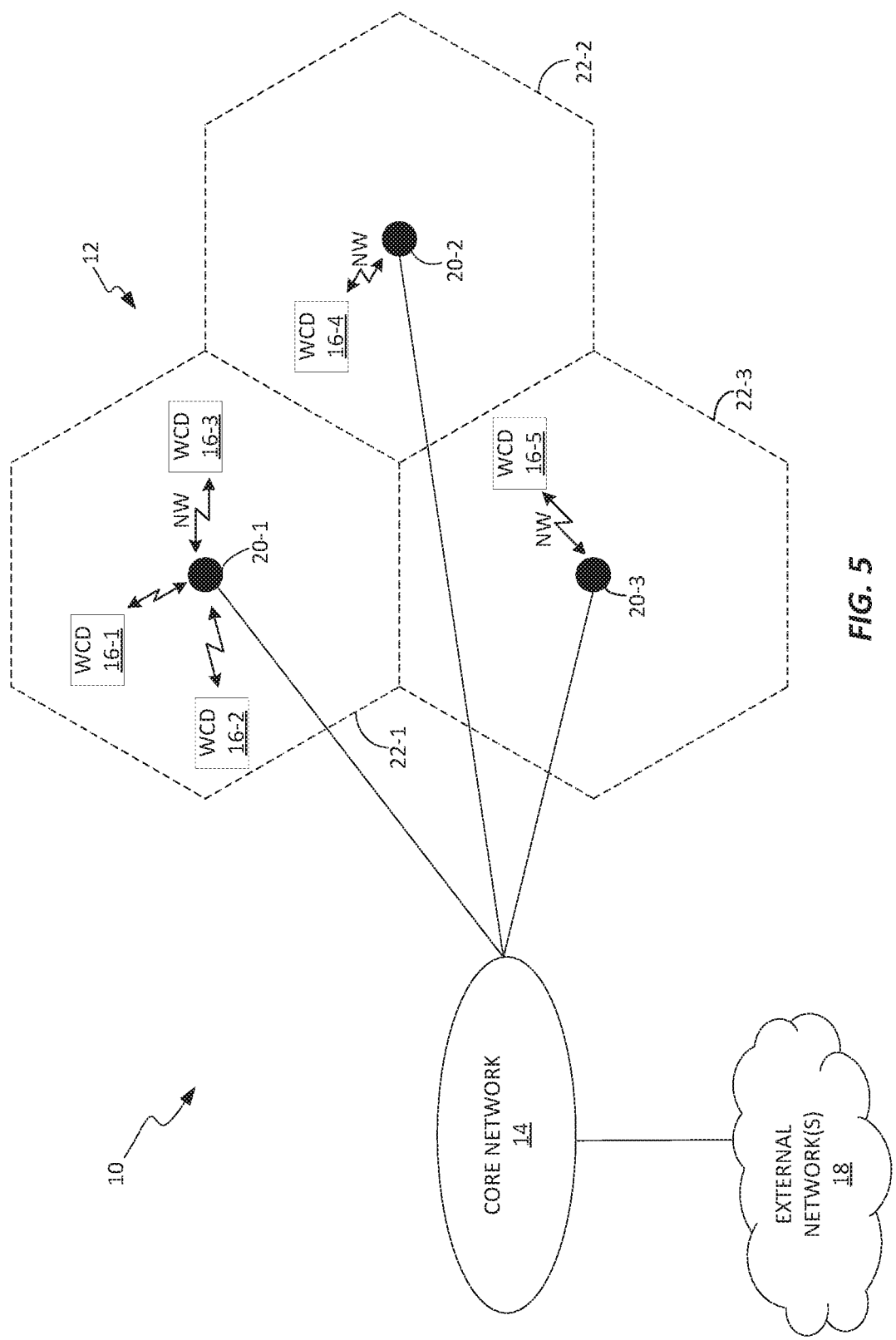
FIG. 5 is a block diagram of one embodiment of a wireless communication network.

To handle enhanced and extreme coverage enhancement scenarios, both UL and DL transmissions may be repeated up to 2048 times for eMTC UEs. More repetitions may be necessary for NB-IoT UEs. During this time, the HD WCD is either transmitting or receiving the same message up to 2048 times. Similarly, the network node is either transmitting or receiving the same message up to 2048 times.

When a HD WCD is engaged in transmissions and in extreme coverage enhancement, it is likely that it will be configured to transmit the same message at the highest TX power in a large number of repetitions. During this time, a conventional HD WCD does not receive, and hence cannot synchronize its reference frequency to the downlink carrier frequency. Further, the high TX power and repeated transmissions heat up the involved Power Amplifier (PA) in the HD WCD, which in turn may heat up the VCXO in the HD WDC. Heating may be particularly problematic when the VCXO is placed close to the PA. Close placement may be unavoidable in compact eMTC and NB-IoT devices.

When the VCXO temperature changes both the WCD reference frequency (which is based on received downlink carrier) and the WCD-internal clock (which is based on the received downlink carrier as well as on analysis of serving cell time drift) start to drift. In non-HD operation, the conventional WCD would have had a chance to detect and mitigate the drift by means of automatic frequency control (AFC), where the non-HD WCD monitors the frequency offset in received reference signals or broadcast channels with known or predictable contents. Non-limiting examples of reference signals are CRS, CSI-RS, NB-CRS, DMRS, PSS, SSS, NB-PSS, NB-SSS, and PRS. Non-limiting examples of channels that once received can be used for frequency offset estimation are PBCH (including PBCH repetition, if configured for eMTC UEs), and NB-PBCH.

When the network node accumulates the repeated WCD transmissions from a conventional HD WCD that is vulnerable to drift during its UL message repetitions, the resulting frequency offsets in the signal received by the network node relative to the uplink demodulation frequency will cause leakage between subcarriers (Resource Elements or REs) in the Fast Fourier Transform (FFT) operation associated with the demodulation. When the frequency offset varies, so will the leakage. The leakage between subcarriers causes an increased level of inter-carrier interference (ICI). In regular coverage, the network node would be able to track and compensate for the WCD-specific frequency offset, but in enhanced and extreme coverage scenarios it becomes challenging or impractical to track the frequency offset due to the uncertainty at low SINR.

Additionally, the time drift in the WCD transmissions introduces time dispersion in the accumulated signal at the network node, and may cause information from adjacent symbols to be included in the accumulation. In regular coverage, the network node would be able to detect the WCD-specific time-drift and would compensate by sending TACs (timing advance commands) to the device to keep the received signal from the WCD aligned with the received signals from other devices in the operation bandwidth (which may comprise multiple NB-IoT carriers (1 PRB each), multiple MTC carriers (6 PRBs each), potentially embedded in a legacy LTE cell, e.g., with bandwidth of 50 or 100 PRBs). In enhanced and extreme coverage, it becomes challenging for the network node to detect the time drift, again due to the low SINR, and furthermore when receiving from a conventional WCD in half-duplex operation there is no downlink channel over which a TAC can be sent.

However, the teachings herein provide mechanisms whereby a HD WCD maintains time and frequency supervision even during extended UL transmissions, i.e., UL transmissions that use a high number of message or transmission repetitions. To maintain synchronization while engaged in an UL transmission comprising a plurality of transmission repetitions (repeated transmissions of the same message for improved reception), the HD WCD temporarily stops its UL transmissions at one or more times within the overall UL transmission window and receives one or more downlink signals, for the purpose of maintaining synchronization with respect to the serving cell. These stoppages may be referred to as synchronization gaps or compensation gaps.

Whether the HD WCD—simply "WCD" or "UE" hereafter—is allowed to use synchronization gaps or not may depend on a pre-defined rule that takes into account WCD category, capabilities, coverage scenario (normal, enhanced, extremely enhanced), reported measurement quality, WCD location information, UE mobility profile and/or the like. In one example, if the reported measurement quality (e.g. RSRP, RSRQ, RS-SINR, etc.) is below a certain threshold then the network node may interpret this as an enhanced- or extreme coverage WCD that requires high number repetitions. Here. RSRP denotes Reference Signal Received Power, RSRQ denotes Reference Signal Received Quality, and RS-SINR denotes Reference Signal SINR.

In another example, based on obtained or acquired information on WCD location and/or WCD mobility profile, the network node can determine whether the WCD in question is a stationary device that is located in a remote location at great distance to the network node or in a location with an extreme path loss, such as a basement or deep inside a large building complex or the like. Such devices may also require high number repetitions. This type of information may help the network in more reliably deciding whether a WCD is to be allowed to use synchronization gaps or not.

The repetition level which the HD WCD is configured with for one or more physical channels is a proxy for the coverage scenario; hence, the determined necessary repetition level may be one of the factors deciding whether synchronization gaps are allowed. For eMTC devices, the repetition level may be that of one or more of the following channels: PUCCH, PUSCH, PRACH on the uplink, and MPDCCH, PDSCH on the downlink. For NB-IoT devices, the repetition level may be that of one or more of the following channels: NB-PUCCH, NB-PUSCH, NB-PRACH on the uplink, and NB-PDCCH, NB-PDSCH on the downlink. The decision may also depend on whether the WCD has requested such gaps explicitly, e.g., via RRC signaling, or whether the network node has indicated that such gaps are to be applied, e.g., via broadcasted information or by dedicated signaling.

In one embodiment, after the decision is made that synchronization gaps are necessary for a given WCD in a given operating condition, the network node sends the relevant configuration information to the WCD in a device-specific RRC message. The synchronization gaps may be aligned with the System Frame Number (SFN), or with the transmission repetition number, and may further depend on the WCD identity, such as the IMSI, S-TMSI, C-RNTI, or other identity that identifies the WCD. Among these IDs, S-TMSI and IMSI are used in legacy systems to determine the position of paging occasions for a UE. As known in the art, the SFN is used in LTE for transmitter/receiver synchronization. The SFN spans a recurring 10 ms frames, using the numbers 0 to 1023, meaning that the value of the SFN at any given time indicates the current frame time.

The network node may indicate via dedicated signaling or broadcasted information that the WCD is allowed to use synchronization gaps for the purpose of staying in sync with the serving cell. Such indication can be signaled using device-specific RRC signaling on a shared channel for a WCD that is in RRC_CONNECTED state. However, if the WCD is in RRC_IDLE state, then RRC signaling on a common channel such as broadcast channel can be used. The indication may carry anything from a single indicator that indicates that a pre-defined rule applies, to a full configuration of the synchronization gap pattern to be applied by the WCD.

Alternatively, in case of mandatory network support of synchronization gaps, at least under certain conditions, e.g., when the repetition level exceeds some threshold value, no explicit indication is needed. As yet another alternative, an implicit indication may be provided, e.g., if a synchronization gap pattern configuration is provided (ranging from pointing out a pre-defined pattern to providing a full configuration with duration, periodicity, and offset to SFN or start of message transmission), the HD WCD knows that the synchronization gap is allowed.

The gap positions in time in a cell may also depend on the physical cell ID (PCI). This approach offers improved inter-cell interference randomization.

The gap positions in time may also account for the channel coding properties of the affected physical channel(s). For example, the gaps can be placed in time in such a way that they avoid overlapping with the transmission of certain redundancy versions (RVs). e.g. RVs containing many systematic bits are avoided for gap placement, as compared to other RVs.

During any given synchronization gap, the WCD may tune back to the downlink carrier and receive broadcasted reference signals or broadcasted channels to resynchronize to the serving cell. For example, the WCD may retune to the downlink for reception of Cell-specific Reference Signals (CRS), Primary/Secondary Synchronization Signals (PSS/SSS), and/or the Physical Broadcast Channel (PBCH). Advantageously, during such gaps, the network node may schedule other WCDs whose repetition levels fit within the duration of the synchronization gap of the first WCD.

The WCD and the network node may exclude or include the TTIs in the synchronization gaps when counting how many repetitions of the message have been transmitted. As noted before, "TTI" denotes Transmission Time Interval. As an example, the TTI may be the smallest time unit allocable for scheduling transmissions to or from a WCD. The network node may take the loss of TTIs into account when deciding the repetition level for the UE. For instance, if 20% of a transmission will comprise gaps and the network node requires X replicas of the message, then the network node may configure 25% more repetitions, i.e., a repetition level corresponding to 1.25×, when the repetition counter includes both TTIs inside and outside gaps.

The periodicity and duration of synchronization gaps may depend on the coverage scenario (or a proxy thereof, such as the determined repetition level of a given channel), taking into account that for successful synchronization by the WCD to the network node, the lower the SINR the more TTIs with broadcasted reference signals or broadcasted channels may be needed.

Particularly, to increase the SNR of an estimated value (e.g. averaged channel sample, channel estimate, and the like) by 3 dB, the involved receiver or node needs to double the samples upon which the estimate is based. Hence if N samples are needed for some given accuracy when the SNR of an individual sample is 0 dB, $2^{\wedge}5 \cdot N$ (32N) samples are needed to achieve the same accuracy when the SNR of an individual sample is −15 dB, and $2^{\wedge}6.67 \cdot N$ (102N) samples are needed when the SNR of an individual sample is −20 dB. Hence, the more challenging the coverage scenario, the more samples may be needed for frequency tuning and hence the more opportunities to acquire and process such samples the HD WCD needs.

The top row in the diagram presented as FIG. 2 illustrates a conventional approach to bundled transmissions, where the sets of repeated UL or DL transmissions are not punctured with synchronization gaps. In the diagram, upward pointing arrows connote UL TTIs, and downward pointing arrows connote DL TTIs. The top row, therefore, depicts a potentially long series (bundle) of uplink repetitions with no interruptions for retuning to the DL. Consequently, a WCD following the depicted convention would lose synchronization over the repetition window, or at least be vulnerable to losing synchronization with the network, in dependence on the quality of its local clock, the relative behavior of the local and network clock, the overall length of the repetition window, etc.

Contrastingly, the bottom row in FIG. 2 illustrates an example implementation of the puncturing contemplated herein. There, the transmitting WCD implements synchronization gaps within bundled UL transmissions, to thereby allow the WCD to receive DL signals during the synchronization gaps, for maintaining synchronization with the network.

The periodicity and duration of synchronization gaps may also depend on the oscillator implementation of the individual WCD. Some WCDs may have an oscillator with less frequency deviation such as a TCXO. In such cases, the network can configure less frequent synchronization gaps. Or, in cases where the network does not configure the synchronization gaps used by the WCD, the WCD may be programmed, configured, or otherwise provisioned with one or more parameter values that control its use of synchronization gaps. In that context, a WCD that included a stable, high-quality clock might puncture a bundled transmission with fewer gaps than would be used by a WCD with a lower-quality clock. In any case, it shall be understood that different WCDs may use different gap spacings, or a given WCD may adjust its gap spacing in dependence on the overall span of the bundled transmission at issue.

Fewer synchronization gaps improves resource utilization. In one example of determining the periodicity or number of synchronization gaps a WCD should use, the network node estimates the frequency error from reference signals received from the WCD on the UL channel.

Typically, a WCD that is allowed to create autonomous gaps to read Master Information Block (MIB) or System Information Block (SIB) transmissions is required to transmit at least a certain number of ACKs/NACKs to ensure that the system performance is not impacted. One advantage of the techniques disclosed herein, at least for some embodiments, is that the information on synchronization gaps (e.g., when they will take place, their duration, etc.) is known to both WCD and network node. Thus, the serving network node can skip its received-signal processing operations for those times corresponding to synchronization gaps. In other words, because the WCD is receiving rather than transmitting in the synchronization gaps, the network node suspends its UL signal processing (e.g., its received-signal accumulations, etc.) in the synchronization gaps.

In one example scenario, the WCD operates under control of a third party (e.g. a second operator or another infrastructure provider). In this case, the WCD can retrieve full or partial information on synchronization gaps from a third-party server over the user plane. In addition, the WCD may also signal the retrieved information on synchronization gaps to other nodes in the network. The non-limiting examples of other nodes are base stations or access points, Proximity Services (ProSe) or Device-to-Device (D2D) UEs, ProSe relays, IoT devices, NB-IoT devices, core network nodes, positioning nodes or any other node used for dedicated services, such as self-organizing network (SON) node.

In a second example, the network node may adapt the synchronization gap pattern based on one or more criteria. Non-limiting examples of such criteria are reported measurement quality, coverage enhancement level. WCD mobility profile. WCD location, etc. The coverage enhancement (CE) levels supported in a cell can vary. For example, CE1 may correspond to 10 dB coverage enhancements, CE2 may correspond to 15 dB coverage enhanced, CE3 may correspond to 20 dB coverage enhancement etc. The network node may use this information to adapt the synchronization gap pattern. The adaptation in this sense means adjustments in the length of the gaps, the frequency of the gaps, the applicability of the gaps, etc. The said synchronization gap pattern may comprise a smaller gap length but with higher frequency in some scenarios, e.g., WCDs configured according to the CE1 case. On the other hand, the synchronization gap pattern may comprise a maximum allowed gap length (e.g. 4 ms) with the highest allowed frequency (repetition rate). Such patterns may be used, for example, with respect to WCDs operating in the CE3 scenario.

In a third example, the network node may adapt its scheduling based on the synchronization gap pattern. If the configured synchronization gap pattern indicates that a WCD will retune to the downlink frequency to perform synchronization, then the network node may schedule another one or more WCDs in those subframes. If such synchronization gaps take place on a periodic basis, then the network node may schedule other types of WCDs in those subframes on the involved carrier frequency. Such scheduling operations may include the network node moving other WCDs that were configured for operation on a different carrier frequency or different RAT to the frequency on which WCD is operating. This way, the load of the network can be distributed on different carriers which are not always used. This method further enables the network node to efficiently use the radio resources.

Embodiments where the synchronization gaps am utilized for other purposes beside maintaining synchronization are also possible. As an example, the gap can be used as an opportunity to indicate to the UE that it can terminate its uplink transmission early because the eNB has already managed to decode the uplink transmission from repetitions already received by the eNB. This signaling can be performed, for example, if the gap contains at least one MPD-CCH transmission opportunity which contains Downlink Control Information (DCI) with a toggled new data indicator (NDI) for the ongoing UL HARQ process. Here. "MPD-DCH" denotes a Physical Downlink Control Channel or PDCCH that is configured in view of the narrower bandwidths used by MTC/IoT devices. Note, too, that the contemplated WCD may operate in HD in a FDD mode, or operate in HD in a TDD mode, where the WCD stays in UL transmission mode for an extended period of time before switching to DL reception mode.

One example of a pre-determined rule for synchronization gap insertion or puncturing within a bundled UL transmission is illustrated in the table depicted as FIG. 3. It shall be understood from the description above that there may be several different levels with different associated synchronization patterns. Moreover, it shall be understood that there may be one or more decision metrics other than the repetition level alone. Furthermore, it shall be understood from the description above that the synchronization gap pattern may be defined in several different ways, e.g. pre-defined pattern, a pattern configured by the network node (dedicated pattern, broadcasted pattern), and so on. Hence, it shall be clear that the rule in the example table seen in FIG. 3 is non-limiting and is provided to illustrate an example embodiment.

Now consider an example of RRC signalling for configuration of synchronization gaps at a WCD, which signalling includes a synchronization gap pattern definition:

```
syncGapConfig ::= CHOICE {
    release         NULL,
    setup           SEQUENCE {
        gapPeriodicity  INTEGER (1..MaxRepetitionLevel),
        gapOffset       INTEGER (0..MaxPeriodicity-1),
        gapDuration     INTEGER (1..MaxRepetitionLevel),
    }
}
```

In another example where the synchronization gaps are defined, the following RRC signaling could be used to indicate a selected gap configuration:

```
syncGapConfig ::=   CHOICE {
    release         NULL,
    setup           SEQUENCE {
        gapOffset       CHOICE {
            gp0             INTEGER (0..PeriodicityGp0-1),
```

-continued

```
    gp1              INTEGER (0..PeriodicityGp1-1),
    gp2              INTEGER (0..PeriodicityGp2-1),
    ...
    }
  }
}
```

Example WCD behavior when receiving a synchronization gap configuration appears below:

The UE shall:
1> if syncGapConfig is set to setup:
  2> if a synchronization gap configuration is already setup, release the synchronization gap configuration;
  2> setup the synchronization gap configuration indicated by the syncGapConfig in accordance with the received gapOffset, (AND gapPeriodicity and gapDuration in case of a signaled synchronization gap pattern definition), i.e., the first subframe of each gap occurs at an SFN and subframe meeting the following condition (SFN and subframe of MCG cells):

$$\text{SFN mod } T = \text{FLOOR(gapOffset/10)};$$
$$\text{subframe} = \text{gapOffset mod 10};$$

with T=SGRP/10 as defined in 3GPP TS 36.133 in case of predefined gaps, OR T=gapPeriodicity/10 in case of a signaled synchronization gap pattern definition;
1> else:
  2> release the synchronization gap configuration.

Some embodiments herein contemplate the use of predefined synchronization gap patterns. In turn, FIG. 4 illustrates an example table of such patterns.

It shall be noted that the examples above are just a subset of the embodiments. For instance, instead of having gap offsets defined by an offset to the SFN, it may be described as an offset to the onset of the TX transmissions. Moreover, the predefined patterns may contain multiple periodicities, and so on.

Now consider the example embodiment of a wireless communication network shown in FIG. 5. The wireless communication network 10 ("network 10") may be a wide-area cellular radio network based on the LTE standard, or based on an another 3GPP standard.

The network 10 includes a Radio Access Network or RAN 12, along with a Core Network or CN 14. The network 10 communicatively couples essentially any number of wireless communication devices 16 (WCDs in the diagram) to each other, or to any number of other systems or devices reachable through one or more external networks 18. Only five WCDs 16 (16-1 through 16-5) are shown by way of example, and it shall be understood that potentially many more WCDs 16 may be operating in the network 10.

It shall also be understood that the WCDs 16 are not necessarily all the same type or function. However, one or more of the WCDs 16 are Machine-Type Communication (MTC) devices, also referred to as M2M devices, or NB-IoT devices, or are otherwise configured to operate in half-duplex (HD) mode and to use potentially large repetition factors ("bundling") when making uplink (UL) transmissions. Thus, it shall be understood that any one or more of the depicted WCDs 16 are configured as eMTC or NB-IoT devices and operate according to any of the embodiments disclosed herein. Correspondingly, one or more of the network nodes 20 implement the network-side teachings disclosed herein, according to any one or more of the example embodiments.

The RAN 12 includes a number of base stations 20, such as eNBs in the LTE context. The base stations are a type of radio network node and are more generally referred to as network nodes 20. In the diagram, each network node 20 provides a coverage area or cell 22, e.g., the network node 20-1 provides the cell 22-1, and so on. As an example, a cell 22 may be regarded as comprising specific communication resources—e.g., specific frequencies and/or times—used for providing network coverage over a corresponding geographic area. Of course, there may be overlapping cells 22, and a given network node 20 may provide more than one cell 22.

Figure 6:
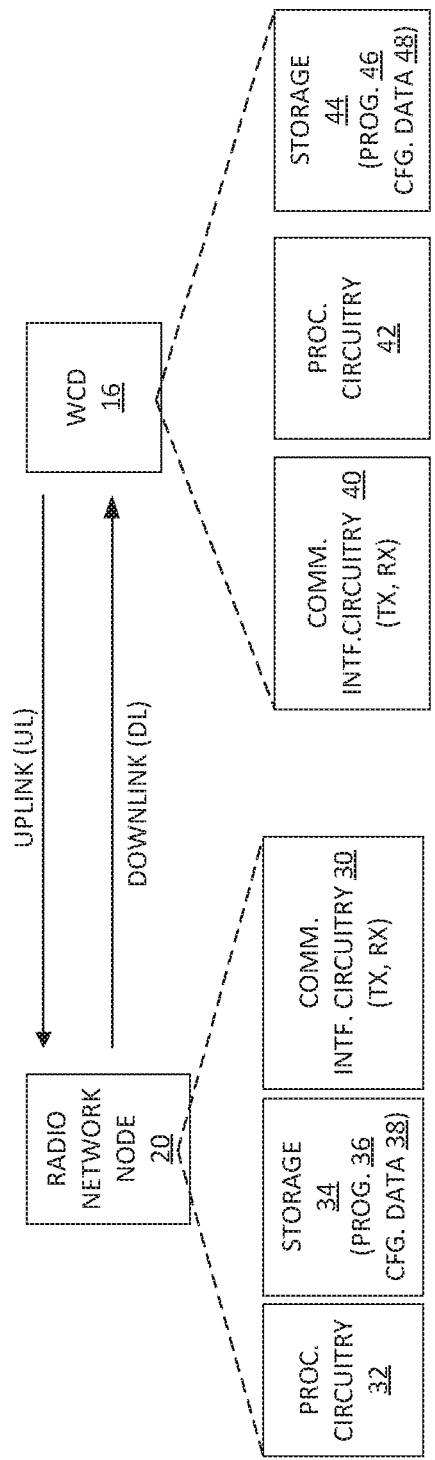
FIG. 6 is a block diagram of example embodiments of a network node and a half-duplex wireless communication device, such as may be configured for operation in the network of FIG. 5.

FIG. 6 illustrates example embodiments of a WCD 16 and a network node 20, which in one or more embodiments are respectively configured to carry out the device-side and network-side teachings disclosed herein.

The network node 20 comprises communication interface circuitry 30, processing circuitry 32, and storage 34. The communication interface circuitry 30 comprises circuitry configured for communicating with one or more WCDs 16, and in one or more embodiments includes circuitry configured for communicating with one or more CN nodes and/or other radio network nodes 20—e.g., "S1" and "X2" interfaces. In an example embodiment, the communication interface circuitry 30 includes one or more cellular radio circuits, such as a transceiver comprising a transmitter (TX) circuit and a receiver (RX) circuit, along with associated transmit and receive processing circuitry, for communicating with WCDs 16.

The processing circuitry 32 comprises fixed circuitry, programmed circuitry, or a mix of fixed and programmed circuitry. In an example embodiment, the processing circuitry 32 comprises one or more microprocessor-based circuits or one or more DSP-based, FPGA-based, or ASIC-based circuits, or any mix thereof. In a particular example, the processing circuitry 32 is specially adapted or otherwise configured to operate according to the network node method(s) disclosed herein, via the execution of computer program instructions in a computer program 36. The processing circuitry 32 may further use and/or store various items of configuration data 38 associated with such operation, via the storage 34. For example, the configuration data 38 contains information indicating or characterizing one or more transmission rules used for inserting gaps into bundled UL transmissions. Such a rule or rules specifies the timing or position of such gaps, e.g., based on UL transmission repetition count, Transmission Time Interval (TTI) numbering, or the like.

The storage 34 comprises any one or more of solid-state storage, disk storage, etc., and may provide both volatile, working memory and non-volatile, program and data storage. The storage 34, therefore, may include a mix of memory or storage circuit or device types. Non-limiting examples include SRAM or DRAM, FLASH, EEPROM, and Solid State Disk (SSD) storage.

In any case, it shall be understood that in one or more embodiments the storage 34 includes a non-transitory computer-readable medium storing a computer program 36, the execution of which by processing circuitry 32 in the radio network node 20 configures such circuitry according to the teachings herein. Non-transitory, as used here, does not necessarily mean permanent or unchanging, but does denote storage of at least some persistence.

Similarly, the WCD 16 comprises communication interface circuitry 40, processing circuitry 42, and storage 44. The communication interface circuitry 40 comprises, for example, one or more cellular radio circuits, such as a transceiver comprising a transmitter circuit (TX) and a receiver circuit (RX), along with associated transmit and receive processing circuitry. The communication interface circuitry 40 may also include other types of circuitry, e.g., for near-field communications, Wi-Fi, Bluetooth, etc.

The processing circuitry 42 comprises fixed circuitry, programmed circuitry, or a mix of fixed and programmed circuitry. In an example embodiment, the processing circuitry 42 comprises one or more microprocessor-based circuits or one or more DSP-based, FPGA-based, or ASIC-based circuits, or any mix thereof.

In a particular example, the processing circuitry 42 is specially adapted or otherwise configured to carry out the device-side operations disclosed herein, via the execution of computer program instructions comprising a computer program 46. The processing circuit 42 may further use and/or store various items of configuration data 48 associated with such operation, via the storage 44. For example, the configuration data 48 holds one or more preconfigured or dynamically configured rules (e.g., as signaled by the network 10) that define the gap duration and position of UL transmission gaps—synchronization or compensation gaps—to be used by the WCD 16 for maintaining timing and frequency synchronization with the network 10 when making bundled UL transmissions.

The storage 44 comprises any one or more of solid-state storage, disk storage, etc., and may provide both volatile, working memory and non-volatile, program and data storage, and thus may include a mix of memory or storage circuits or device types. Non-limiting examples include SRAM or DRAM, FLASH, EEPROM, and Solid State Disk (SSD) storage. In any case, it shall be understood that in one or more embodiments the storage 44 includes a non-transitory computer-readable medium storing a computer program 46, the execution of which by processing circuitry 42 in the WCD 16 configures the processing circuitry 42 according to the teachings herein.

Figure 7:
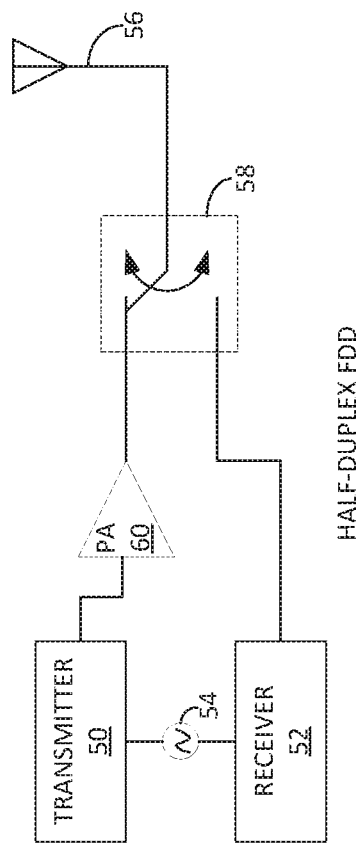
FIG. 7 is a block diagram of an example embodiment of half-duplex transceiver circuitry, as a may be implemented in a half-duplex wireless communication device.

FIG. 7 illustrates an example HD configuration of a transmitter 50 and receiver 52, as may be used in the WCD 16 of FIG. 6 for HD FDD operation. In the example implementation, the transmitter 50 and receiver 52 share one oscillator 54. For receiving data from a network node 20 in the network 10, the WCD 16 sets the center frequency to the corresponding DL frequency and switches the antenna 56 to the receiver path, via control of a switch 58. Conversely, for transmitting UL data, the WCD 16 sets the center frequency to the corresponding UL frequency and switches the antenna 56 to the transmitter path. As evident from the example illustration, the WCD 16 cannot receive synchronization signals from the network 10 when it is transmitting, and it may be noted that the oscillator 54 may be prone to heating by the PA 60.

FIG. 8 illustrates one embodiment of a method 800 of processing at a network node, e.g., the network node 20 introduced in FIGS. 5 and 6. The method 800 includes receiving (Block 802) a bundled uplink (UL) transmission from a HD WCD 16, the bundled UL transmission comprising a set of repeated UL transmissions and including one or more synchronization gaps during which the HD WCD 16 suspends UL transmission. The method 800 further includes identifying (Block 804) the one or more synchronization gaps within the bundled UL transmission, and suspending (Block 806) reception processing for the bundled UL transmission with respect to the one or more synchronization gaps.

The reception processing in one or more embodiments includes accumulating the repeated UL transmissions for reception gain, and the step of suspending (Block 806) the reception processing for the bundled UL transmission comprises suspending accumulation processing with respect to the one or more synchronization gaps, to thereby avoid spurious accumulations.

In the same or another embodiment, the bundled transmission spans a plurality of subframes or transmission time intervals (TTIs), and the step of identifying (Block 804) the one or more synchronization gaps within the bundled transmissions comprises determining which of the subframes or TTIs correspond to a synchronization gap pattern in use by the HD WCD 16. The HD WCD 16 inserts the one or more synchronization gaps into the bundled UL transmission according to a rule, for example, and the network node 20 in such an embodiment identifies the synchronization gaps in the bundled UL transmission based on its knowledge of the rule.

Further steps may be included in the method 800, such as, before the step of receiving (Block 802) the bundled UL transmission, determining that a repetition factor associated with the HD WCD 16 exceeds a time limit and, in response, sending signaling to the HD WCD 16 to insert synchronization gaps when making bundled UL transmissions. Here, the repetition factor corresponds to the number of repeated UL transmissions in the set of repeated UL transmissions comprising a given bundled UL transmission by the HD WCD 16. Further, the time limit corresponds to how long the HD WCD 16 can maintain sufficient timing or frequency synchronization with the network node without receiving DL signals from the network node 20.

In one example, the HD WCD 16 is an eMTC device and the bundled UL transmission is a PUCCH transmission, a PUSCH transmission, or a PRACH transmission. In another example, the HD WCD 16 is a NB-IoT device and the bundled UL transmission is a NB-PUCCH transmission, a NB-PUSCH transmission, or a NB-PRACH transmission. Further, at least when the bundled UL transmission is a PRACH or NB-PRACH transmission, the step of identifying (Block 804) the one or more synchronization gaps within the bundled UL transmission is based on the network node 20 assuming that the HD WCD 16 uses synchronization gaps.

Still further, the method 800 may include receiving other information from the HD WCD 16. For example, in at least some embodiments, the network node 20 receives an indication from the HD WCD 16 that the HD WCD 16 uses synchronization gaps. Such signaling triggers, for example, the identification of synchronization gaps within a bundled transmission from the HD WCD 16 and the corresponding received-signal processing suspensions described above. Of course, in other instances, such as where synchronization gap insertion is mandatory, at least in certain cases or under certain conditions, the network node 20 may presume that one or more synchronization gaps puncture any given bundled transmission it receives. Further, the network node 20 may know the location of those gaps, e.g., based on knowing a default or specific configuration used at the HD WCD 16 for synchronization-gap insertion, or based on detecting the gaps.

In a corresponding example embodiment, and with reference back to FIG. 6, a network node 20 as contemplated herein is configured for operation in a wireless communication network 10 and communication interface circuitry 30 configured to communicate with a HD WCD 16, and processing circuitry 32 operatively associated with the communication interface circuitry 30. The processing circuitry 32 is configured to receive a bundled UL transmission from a HD WCD 16, where the bundled UL transmission comprises a set of repeated UL transmissions and includes one or more synchronization gaps during which the HD WCD 16 suspends UL transmission. The processing circuitry 32 is further configured to identify the one or more synchronization gaps within the bundled UL transmission, and suspend reception processing for the bundled UL transmission with respect to the one or more synchronization gaps.

Broadly, a network node 20 as contemplated herein is configured to carry out the method 800 and any extensions or variations thereof. For example, the network node 20 includes one or more processors and memory which contains program instructions the execution of which configures the network node 20 according to the teachings herein. In a related example, the network node 20 includes one or more processing modules, e.g., a receiving module configured to carry out the operations suggested by Block 802 in FIG. 8, an identifying module configured to carry out the operations suggested by Block 804, and a suspending module configured to carry out the operations suggested by Block 806. Such operations may be embodied in a computer program product. e.g., as stored in a computer-readable medium or conveyed via a carrier signal or other medium.

FIG. 9 illustrates an example method 900 of processing performed by a HD WCD, e.g., the HD WCD 16 introduced in FIGS. 5 and 6. The method 900 includes performing (Block 902) a bundled UL transmission towards a network node 20 in a wireless communication network 10, where the bundled UL transmission comprises a set of repeated UL transmissions. The method 900 further includes inserting (Block 904), at least on a conditional basis, one or more synchronization gaps into the bundled UL transmission, and suspending (Block 906) UL transmission during the one or more synchronization gaps, to receive DL signals from the network node 20, for maintaining synchronization with the network node 20.

In some embodiments, the insertion of synchronization gaps is conditional, at least in some implementations or instances. In at least one such embodiment, the step of inserting (Block 904) the one or more synchronization gaps is performed conditionally, in dependence on at least one of the following: whether the network node 20 has indicated that synchronization gaps are permitted or should be used; the overall number of repeated UL transmissions comprising the bundled UL transmission, or an overall time span represented by the bundled UL transmission; and the amount of time between instances of DL reception that the HD WCD 16 can maintain synchronization with the network node 20.

In at least one embodiment, the method 900 includes the HD WCD 16 sending an indication to the network node 20 that the HD WCD 16 uses synchronization gaps. The indication may include or be accompanied by further information detailing the manner or configuration of insertion, any conditionality, etc.

The HD WCD 16 is an eMTC device, for example, and the bundled UL transmission is a PUCCH transmission, a PUSCH transmission, or a PRACH transmission. In another embodiment or example case, the HD WCD 16 is a NB-IoT device and the bundled UL transmission is a NB-PUCCH transmission, a NB-PUSCH transmission, or a NB-PRACH transmission.

Further, in at least some embodiments, the method 900 further includes configuring the insertion of the synchronization gaps according to a rule configured in the HD WCD 16. That is, when inserting synchronization gaps, the HD WCD 16 follows a rule governing how, when, or in what manner it makes the insertions. The rule is preconfigured in the HD WCD 16, for example, or is dynamically configured in the HD WCD 16, e.g., based on signaling received from the wireless communication network 10.

A HD WCD 16 in a corresponding example is configured for operation in a wireless communication network 10 and includes communication interface circuitry 40 configured to communicate with a network node 20 in the wireless communication network 10, and processing circuitry 42 operatively associated with the communication interface circuitry 40. The processing circuitry 42 is configured to: perform a bundled UL transmission towards the network node 20 in the wireless communication network 10. The bundled UL transmission comprises a set of repeated UL transmissions and the processing circuitry 42 is configured to insert, at least on a conditional basis, one or more synchronization gaps into the bundled UL transmission. Correspondingly, the processing circuitry 42 is configured to suspend UL transmission during the one or more synchronization gaps, to receive DL signals from the network node 20, for maintaining synchronization with the network node 20.

Broadly, a HD WCD 16 as contemplated herein is configured to carry out the method 900 and any extensions or variations thereof. For example, the HD WCD 16 includes one or more processors and memory which contains program instructions the execution of which configures the HD WCD 16 according to the teachings herein. In a related example, the HD WCD 16 includes one or more processing modules, e.g., a transmitting module configured to carry out the operations suggested by Block 902 in FIG. 9, an inserting module configured to carry out the operations suggested by Block 904, and a suspending module configured to carry out the operations suggested by Block 906. Such operations may be embodied in a computer program product, e.g., as stored in a computer-readable medium or conveyed via a carrier signal or other medium.

In another example embodiment, the network node 20 is configured to determine a repetition level for uplink transmission of a channel by the HD WCD 16, determine that the repetition level exceeds a threshold by which the HD WCD 16 shall resynchronize in between groups of repetitions, and configure a synchronization gap pattern and schedule the HD WCD 16 according to the determined repetition level. The network node 20 may further determine when the HD WCD 16 is transmitting and resynchronizing, respectively, and accumulate received signals from the HD WCD 16 during the time(s) the HD WCD 16 is transmitting.

In the above example, the network node 20 may determine the repetition level based on one or more of: the coverage level reported by the HD WCD 16; uplink measurements conducted by the network node 20, such as UL RSRP, UL BLER, UL BER, the number of received repetitions needed for successful decoding of a message, PRACH resource set selected by the HD WCD 16, where the resource set includes one or more of the repetition level of the PRACH, the frequency resource of the PRACH, and the time domain configuration of the PRACH; and DL BLER as determined by the network node 20 based on feedback or the absence of feedback from the HD WCD 16.

The threshold may be based on at least one of: capability reported by the HD WCD 16, including for instance HD operation, or the explicit need for synchronization gaps; the class reported by the HD WCD 16 (e.g. MTC class(es), NB-IoT class(es)); an explicit request by the HD WCD 16 on synchronization gaps; a pre-defined rule in the applicable communication standard(s); and a frequency drift estimated from the UL reference signals transmitted by the HD WCD 16.

The synchronization-gap configuration in an example case comprises at least one of: the number of repetitions to apply by the HD WCD 16; an indication on whether synchronization gaps are allowed for the HD WCD 16; a duration of a synchronization gap; one or more positions in time (e.g. relative to the SFN or relative to the first transmission) for the synchronization gaps; and the identity of a pre-defined synchronization gap pattern, e.g., as indicated by an index or pointer.

As a further example, the network node 20 determining whether the HD WCD 16 is in a synchronization gap comprises at least one of: determining based on an explicit configuration provided to the HD WCD 16 and TTI numbers associated with TTIs, as to whether a certain TTI is in a synchronization gap; and determining based on a WCD identity (e.g., IMSI, S-TMSI, C-RNTI, temporary C-RNTI, SPS-RNTI) and the TTI numbers, as to whether a certain TTI is in a synchronization gap.

As a further example of processing carried out by a HD WCD 16, the HD WCD 16 may be configured to: determine that synchronization gaps are allowed for the received uplink scheduling grant; determine time position(s) and duration(s) of synchronization gap(s); transmit a message according to scheduling information and synchronization gap configuration when outside gap; and receive downlink reference signal(s) and/or broadcasted channels when inside gap, and use gap-received downlink signals for resynchronization in time and frequency to the serving cell.

The HD WCD 16 in one or more embodiments determines that synchronization gaps are allowed is based on any one or a combination of: capability reported to the network node (including for instance HD operation, or the explicit need for synchronization gaps); a class reported to the network node (e.g. MTC class(es), NB-IoT class(es)); a granted explicit request to the network node on synchronization gaps; a pre-defined rule in the applicable communication standard(s); coverage reported to the network node 20; the number of repetitions configured by the network node 20; a configuration of synchronization gap (pattern) by the network node 20; an indication sent by the network node 20 indicating that synchronization gaps are allowed; and information acquired via broadcasted system information, as broadcasted within the network 10.

Determining by a HD WCD 16 the time position(s) and duration(s) of the synchronization gap(s) comprises, for example, at least one of: comparing TTI number and a synchronization gap pattern; and comparing message repetition number and a synchronization gap pattern. Further, a synchronization gap pattern may be provided or indicated as one or a combination of: an explicit configuration by the network node (broadcasted, dedicated signaling); and a predefined rule in the standard.

As further example operations at the HD WCD 16, transmitting messages outside of the gap(s) includes one or more instances of: transmitting a message; and increasing a repetition counter. Additional actions inside a gap comprise increasing a repetition counter for each TTI inside the gap. Further, the HD WCD 16 may stop the transmissions, in a given bundled UL transmission, after the repetition counter has reached a certain number, as configured by the network node 20.

The invention claimed is:

1. A method of operation in a network node configured for operation in a wireless communication network:
   receiving, from a half-duplex (HD) wireless communication device (WCD), an indication of a need for puncturing a bundled uplink (UL) transmission with one or more synchronization gaps, wherein the bundled UL transmission comprises a set of repeated UL transmissions and wherein each synchronization gap replaces at least one of the repeated UL transmissions within the set with a gap during which the WCD suspends UL transmission to synchronize with the network node based on receiving a downlink (DL) signal from the network node;
   receiving the bundled UL transmission from the HD WCD, said bundled UL transmission comprising the set of repeated UL transmissions, as punctured by the one or more synchronization gaps;
   identifying the one or more synchronization gaps within the bundled UL transmission; and
   suspending reception processing for the bundled UL transmission with respect to each of the one or more synchronization gaps.

2. The method of claim 1, wherein the reception processing includes accumulating the repeated UL transmissions for reception gain, and wherein suspending the reception processing for the bundled UL transmission comprises suspending accumulation processing with respect to the one or more synchronization gaps, to thereby avoid spurious accumulations.

3. The method of claim 1, wherein the bundled UL transmission spans a plurality of subframes or transmission time intervals (TTIs), and wherein identifying the one or more synchronization gaps within the bundled UL transmission comprises determining which of the subframes or TTIs correspond to a synchronization gap pattern in use by the HD WCD.

4. The method of claim 1, wherein the HD WCD inserts the one or more synchronization gaps into the bundled UL transmission according to a rule, and wherein the network node identifies the synchronization gaps in the bundled UL transmission based on knowledge of the rule at the network node.

5. The method of claim 1, further comprising, before receiving the bundled UL transmission, determining that a repetition factor associated with the HD WCD exceeds a time limit and, in response, sending signaling to the HD WCD to insert synchronization gaps when making bundled UL transmissions, said repetition factor corresponding to the number of repeated UL transmissions in the set of repeated UL transmissions comprising a given bundled UL transmission by the HD WCD, and said time limit corresponding to how long the HD WCD can maintain sufficient timing or frequency synchronization with the network node without receiving the DL signal from the network node.

6. The method of claim 1, wherein the HD WCD is an enhanced Machine Type Communication (eMTC) device and the bundled UL transmission is a Physical Uplink Control Channel (PUCCH) transmission, a Physical Uplink Shared Channel (PUSCH) transmission, or a Physical Random Access Channel (PRACH) transmission.

7. The method of claim 1, wherein the HD WCD is a Narrowband Internet-of-Things (NB-IoT) device and the bundled UL transmission is a NB Physical Uplink Control Channel (NB-PUCCH) transmission, a NB Physical Uplink Shared Channel (NB-PUSCH) transmission, or a NB Physical Random Access Channel (NB-PRACH) transmission.

8. The method of claim 1, wherein, at least when the bundled UL transmission is a Physical Random Access Channel (PRACH) or Narrowband (NB) PRACH transmission, the step of identifying the one or more synchronization gaps within the bundled UL transmission is based on the network node assuming that the HD WCD uses synchronization gaps.

9. The method of claim 1, further comprising receiving an indication from the HD WCD that the HD WCD uses synchronization gaps.

10. A network node configured for operation in a wireless communication network, the network node comprising:
- communication interface circuitry configured to communicate with a half-duplex (HD) wireless communication device (WCD); and
- processing circuitry operatively associated with the communication interface circuitry and configured to:
  - receive, from the HD WCD, an indication of a need for puncturing a bundled uplink (UL) transmission with one or more synchronization gaps, wherein the bundled UL transmission comprises a set of repeated UL transmissions and wherein each synchronization gap replaces at least one of the repeated UL transmissions within the set with a gap during which the WCD suspends UL transmission to synchronize with the network node based on receiving a downlink (DL) signal from the network node;
  - receive the bundled UL transmission from the HD WCD, said bundled UL transmission comprising the set of repeated UL transmissions, as punctured by the one or more synchronization gaps;
  - identify the one or more synchronization gaps within the bundled UL transmission; and
  - suspend reception processing for the bundled UL transmission with respect to each of the one or more synchronization gaps.

11. The network node of claim 10, wherein the reception processing includes accumulating the repeated UL transmissions for reception gain, and wherein the processing circuitry is configured to suspend the reception processing for the bundled UL transmission by suspending accumulation processing with respect to the one or more synchronization gaps, to thereby avoid spurious accumulations.

12. The network node of claim 10, wherein the bundled UL transmission spans a plurality of subframes or transmission time intervals (TTIs) and wherein the processing circuitry is configured to identify the one or more synchronization gaps within the bundled UL transmission by determining which of the subframes or TTIs correspond to a synchronization gap pattern in use by the HD WCD.

13. The network node of claim 10, wherein the HD WCD inserts the one or more synchronization gaps into the bundled UL transmission according to a rule, and wherein the processing circuitry is configured to identify the synchronization gaps in the bundled UL transmission based on knowledge of the rule at the network node.

14. The network node of claim 10, wherein the processing circuitry is configured to determine, before receiving the bundled UL transmission, that a repetition factor associated with the HD WCD exceeds a time limit and, in response, send signaling to the HD WCD to insert synchronization gaps when making bundled UL transmissions, the repetition factor corresponding to the number of repeated UL transmissions in the set of repeated UL transmissions comprising a given bundled UL transmission by the HD WCD, and the time limit corresponding to how long the HD WCD can maintain sufficient timing or frequency synchronization with the network node without receiving the DL signal from the network node.

15. The network node of claim 10, wherein the HD WCD is an enhanced Machine Type Communication (eMTC) device and the bundled UL transmission is a Physical Uplink Control Channel (PUCCH) transmission, a Physical Uplink Shared Channel (PUSCH) transmission, or a Physical Random Access Channel (PRACH) transmission.

16. The network node of claim 10, wherein the HD WCD is a Narrowband Internet-of-Things (NB-IoT) device and the bundled UL transmission is a NB Physical Uplink Control Channel (NB-PUCCH) transmission, a NB Physical Uplink Shared Channel (NB-PUSCH) transmission, or a NB Physical Random Access Channel (NB-PRACH) transmission.

17. The network node of claim 10, wherein, at least when the bundled UL transmission is a Physical Random Access Channel (PRACH) or Narrowband (NB) PRACH transmission, the processing circuitry is configured to assume that the HD WCD uses synchronization gaps.

18. The network node of claim 10, wherein the processing circuitry is further configured to receive an indication from the HD WCD that the HD WCD uses synchronization gaps.

19. A method of operation in a half-duplex (HD) wireless communication device (WCD) configured for operation in a wireless communication network:
- providing, to a network node in the wireless communication network, an indication of a need for puncturing in a bundled uplink (UL) transmission with one or more synchronization gaps, wherein the bundled UL transmission comprises a set of repeated UL transmissions and wherein each synchronization gap replaces at least one of the repeated UL transmissions within the set with a gap during which the WCD suspends UL transmission to synchronize with the network node based on receiving a downlink (DL) signal from the network node;
- performing the bundled UL transmission towards the network node by repeating an UL transmission at defined times within an overall UL transmission window except for respective ones of the defined times corresponding to the one or more synchronization gaps, for which the WCD suspends UL transmission to synchronize with the network node based on receiving the DL signal from the network node.

20. The method of claim 19, further comprising sending an indication to the network node that the HD WCD uses synchronization gaps.

21. The method of claim 19, wherein the HD WCD is an enhanced Machine Type Communication (eMTC) device and the bundled UL transmission is a Physical Uplink Control Channel (PUCCH) transmission, a Physical Uplink Shared Channel (PUSCH) transmission, or a Physical Random Access Channel (PRACH) transmission.

22. The method of claim 19, wherein the HD WCD is a Narrowband Internet-of-Things (NB-IoT) device and the bundled UL transmission is a NB Physical Uplink Control Channel (NB-PUCCH) transmission, a NB Physical Uplink Shared Channel (NB-PUSCH) transmission, or a NB Physical Random Access Channel (NB-PRACH) transmission.

23. The method of claim 19, further comprising configuring the insertion of the synchronization gaps according to a rule configured in the HD WCD.

24. The method of claim 23, wherein the rule is preconfigured in the HD WCD or is dynamically configured in the HD WCD, based on signaling received from the wireless communication network.

25. A half-duplex (HD) wireless communication device (WCD) configured for operation in a wireless communication network and comprising:
   communication interface circuitry configured to communicate with a network node in the wireless communication network; and
   processing circuitry operatively associated with the communication interface circuitry and configured to:
      send, to the network node, an indication of a need for puncturing a bundled uplink (UL) transmission with one or more synchronization gaps, wherein the bundled UL transmission comprises a set of repeated UL transmissions and wherein each synchronization gap replaces at least one of the repeated UL transmissions within the set with a gap during which the WCD suspends UL transmission to synchronize with the network node based on receiving a downlink (DL) signal from the network node;
      perform the bundled UL transmission towards the network node by repeating an UL transmission at defined times within an overall UL transmission window except for respective ones of the defined times corresponding to the one or more synchronization gaps, for which the WCD suspends UL transmission to synchronize with the network node based on receiving the DL signal from the network node.

26. The HD WCD of claim 25, further comprising sending an indication to the network node that the HD WCD uses synchronization gaps.

27. The HD WCD of claim 25, wherein the HD WCD is an enhanced Machine Type Communication (eMTC) device and the bundled UL transmission is a Physical Uplink Control Channel (PUCCH) transmission, a Physical Uplink Shared Channel (PUSCH) transmission, or a Physical Random Access Channel (PRACH) transmission.

28. The HD WCD of claim 25, wherein the HD WCD is a Narrowband Internet-of-Things (NB-IoT) device and the bundled UL transmission is a NB Physical Uplink Control Channel (NB-PUCCH) transmission, a NB Physical Uplink Shared Channel (NB-PUSCH) transmission, or a NB Physical Random Access Channel (NB-PRACH) transmission.

29. The HD WCD of claim 25, wherein the processing circuitry is configured to configure the insertion of the synchronization gaps according to a rule configured in the HD WCD.

30. The HD WCD of claim 29, wherein the rule is preconfigured in the HD WCD or is dynamically configured in the HD WCD, based on signaling received from the wireless communication network.

* * * * *